March 29, 1932.    R. T. HAZELTON    1,851,307
RELEASABLE SHAFT ROTATING DEVICE
Filed Feb. 24, 1930    2 Sheets-Sheet 2

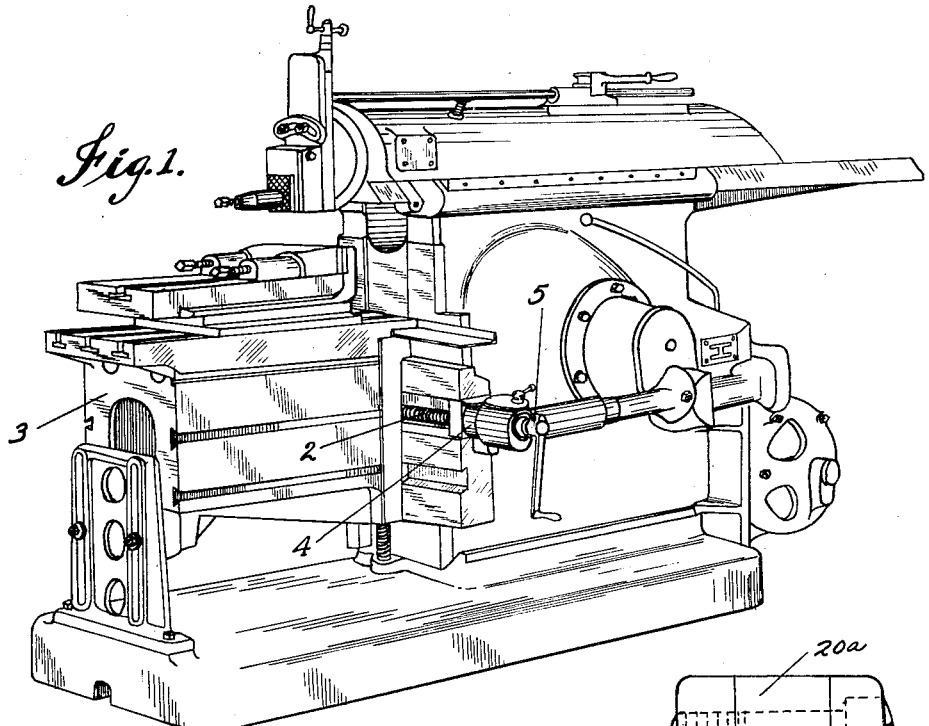
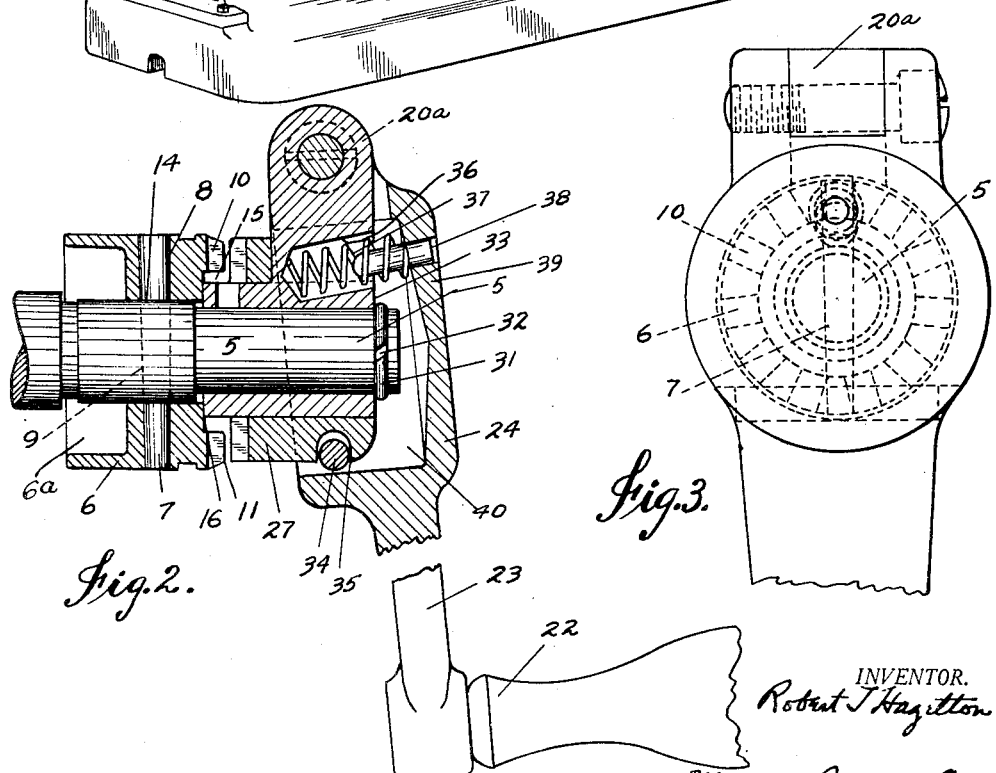

INVENTOR.
Robert T Hazelton
BY
Allen & Allen
ATTORNEYS

Patented Mar. 29, 1932

1,851,307

UNITED STATES PATENT OFFICE

ROBERT T. HAZELTON, OF CINCINNATI, OHIO, ASSIGNOR TO THE CINCINNATI SHAPER COMPANY, OF CINCINNATI, OHIO, A CORPORATION OF OHIO

RELEASABLE SHAFT-ROTATING DEVICE

Application filed February 24, 1930. Serial No. 430,622.

My device relates to cranks such as are used on machine tools and other machines which require adjustment at certain periods of their operation.

It is an object of my invention to provide a crank which is always in place ready for operation, yet will not rotate during the time the parts (which can be manually operated by means of the crank) are driven by another source of power.

Another object is to provide a fine toothed clutch that can readily be engaged and in which the meshing teeth are arranged so as to be engaged each with the other within a small fractional rotation of the spindle or shaft which it is to rotate.

Another object is to provide a crank secured to a spindle or shaft in such a manner that it will automatically be relieved from engagement and allow the spindle or shaft to rotate while the crank remains at rest, and which can easily be held in engagement by the natural force resulting from the rotation of a crank.

These and other objects which will be more specifically pointed out hereinafter or will be apparent to one skilled in the art upon reading these specifications, I accomplish by that certain construction and arrangement of parts of which I shall now describe a preferred embodiment, reference being had to the drawings which form a part hereof.

In the drawings:—

Figure 1 is a perspective of a shaper showing one application of my device.

Figure 2 is a section through the crank attached to an end of a spindle or shaft.

Figure 3 is an end plan view of the same.

Figure 4:
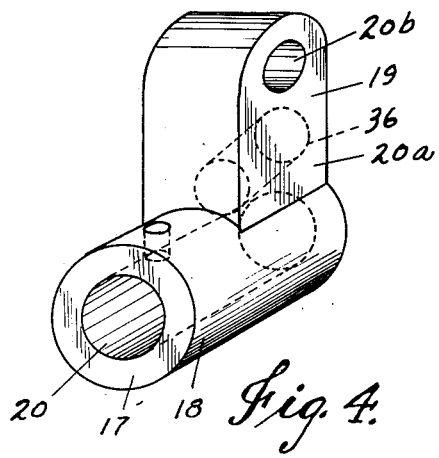
Figure 4 is a perspective of the pivot support for the crank handle.
Figure 5:
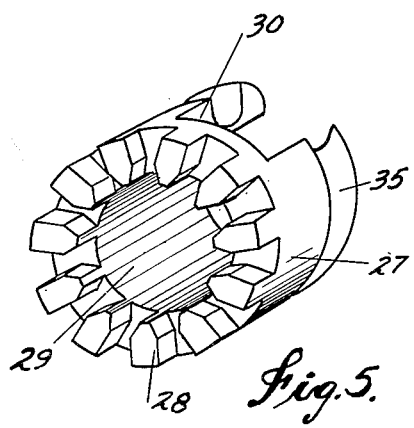
Figure 5 is a perspective view of the sliding half of the clutch.
Figure 6:
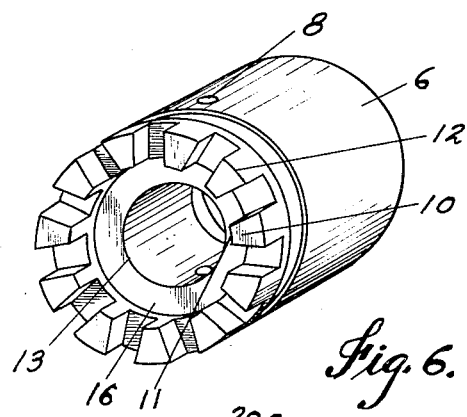
Figure 6 is a perspective of the stationary half of the clutch.
Figure 7:
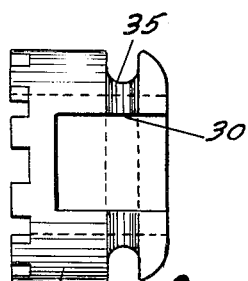
Figure 7 is a plan view of the sliding half of the clutch emphasizing the slot for the pivot support.

For the purpose of illustrating the use of my device, I have shown a shaper 1 which has a lead or feed screw 2 for moving a cross-slide 3. The screw is rotatably mounted in bearings 4, and its end generally extends beyond this bearing so that a crank can be applied to rotate it manually when the power drive is diconnected from it. To this end 5 of the screw I apply my device.

Referring to Figure 2, the end of the shaft has the stationary half 6 of my clutch fixed to it by means of a tapered pin 7 which passes through a reamed hole 8 in the clutch in line with a hole 9 in the screw end or shaft. This half of the clutch may have a counterbored hole 6a which will slip over a turned part of the bearing and insure against any cocking of the member 6 on the shaft 5. This half of the clutch is provided with teeth 10 which may be of any suitable size and number. In the embodiment shown, they are wedge-shaped with the inner edges 11 narrower than the outer edges 12. I preferably employ such a number of teeth as will allow the substantially instant engagement of my crank with the shaft. These teeth do not extend to the edge of a central hole 13 which has a bearing on the portion 14 of the shaft end, but are short enough to provide a counterbored section 15. The bottom of the counterbore provides a shoulder 16 against which a face 17 of a crank pivot support 19 (to be explained) bears and fixes the position of the crank pivot support on the end 5 of the screw or shaft.

Figure 8:
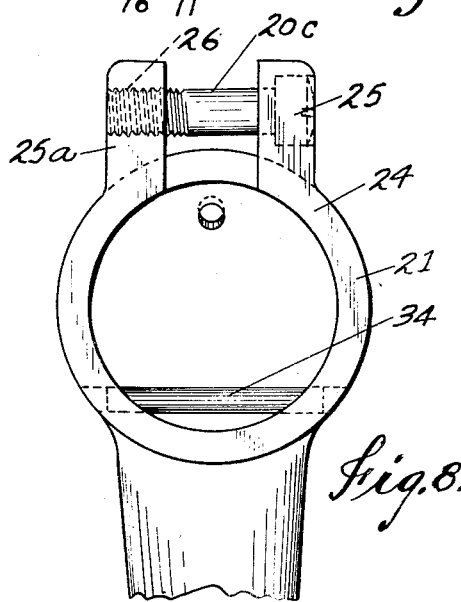
Figure 8 is a rear view of the hollow portion of the crank and pivot.
Figure 9:
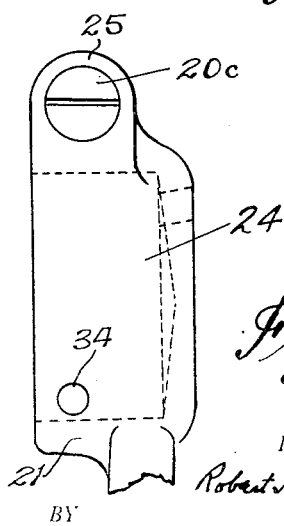
Figure 9 is a side view of the crank and pivot support.

The crank pivot support consists of a boss 18 (see Fig. 4) in which is a hole 20 for mounting it upon the end of screw or shaft 5 rotatably. Extending radially from the boss is a lug 20a which has a transverse hole 20b in which a pivot pin 20c, shown in this case as a screw 20c in Figure 8, is free to rotate for pivotally connecting the crank 21 to the crank pivot support.

The crank 21 comprises a handle 22 extending from a shank 23. The upper end 24 of the crank has a hollow circular cup provided upon one side with two lugs 25 and 25a with a tapped hole 26 into which the pivot pin 20c is screwed after inserting the lug 20 between them. The two lugs on the crank, together with the lug on the crank pivot support, form a hinged joint, as will be clear from Figures 2 and 3.

The sliding half of the clutch 27 has teeth 28 similar in form and free to mesh with the spaces between the teeth of the stationary half of the clutch. The member 27 has a hole 29 to accommodate the boss 18 of the crank pivot support, and although slidably mounted thereon, it is prevented from rotating with relation to the crank pivot support 19 by the lug 20a which fits into a slot 30 in the sliding half of the clutch. When this half clutch is on the hub 18 it can slide on and rotate with the crank pivot support, but cannot rotate independently of it.

As has been explained, the crank pivot support is rotatively mounted on the end of the shaft, and it is held from sliding in relation to the shaft by means of a split ring 31 which fits into a groove 32 in the shaft and bears against the face 33 of the crank pivot support. This ring holds the face 17 in contact with the shoulder 16, thus insuring the disengagement of the clutch members. The sliding half 27 of the clutch is slid into mesh by means of a pin 34 which is fixed transversely in the cup 24 and is loosely fitted into a concave groove 35 on the member 27.

The crank pivot support has a hole 36 for a spring 37 which is positioned by means of a pin 38 fixed in the wall 39 of the cup. This spring is the means for automatically disengaging the clutch when the crank is not held by the hand of an operator.

In assembling my device, the fixed half of the clutch is fastened in place on the shaft by means of the taper pin 8. The sliding half of the clutch is then slid onto the boss of the crank pivot support, which in turn is placed on the shaft end. The split ring 31 is then inserted in the groove 32, and holds the crank pivot support in non-slidable but rotatable manner on the screw end, with its inner end substantially in contact with the fixed clutch portion 6. The spring 37 is inserted into its hole and the crank is pivotally connected to the lug 20a by means of the pivot pin 20c. After connecting the crank to its support the pin 34 is inserted through the holes in the cup in engagement with the concave groove of the sliding half of the clutch.

The operation of my device is as follows:— In order to move the cross-slide manually, I push the crank handle to the left (see Figure 2). In doing so, I cause the pin 34 in the groove 35 to slide the member 27 along the boss 18 and bring the teeth in mesh with the teeth on the stationary half of the clutch. During this movement the crank pivot support will not slide, and therefore the spring 37 will be compressed. When the teeth are in mesh I can rotate the spindle by rotating the crank handle in a plane perpendicular to the plane of Figure 2. After moving the cross-slide a required distance, I release my hold on the handle, which permits the spring to expand and push the crank to the right. While the handle is moving to the right the half clutch will move with it because of the engagement of the pin 34 therewith, and the teeth of the interengaging clutch parts will thereby be disengaged. When the clutch is not in mesh the screw or shaft can be rotated by power means, but the crank will not rotate.

Having thus described my invention, what I claim as new and desire to secure by Letters Patent, is:—

1. In a mechanism for turning a shaft, a fixed clutch half mounted on the shaft, a handle mounting member rotatable but axially immovable on the shaft, a handle and a clutch half movably carried by the handle mounting member, and means whereby a movement of the handle moves said second clutch half into and out of engagement with said first mentioned clutch half, both clutch halves comprising a disc with a plurality of teeth.

2. In a device for manually rotating a shaft, a fixed clutch half mounted on the shaft, a handle mounting member rotatable but axially immovable on said shaft, a handle pivoted to said handle mounting member, a movable clutch half slidably but non-rotatably mounted on said handle mounting member, and means whereby a movement of said handle moves said second clutch half along said handle mounting member, both clutch halves comprising a disc with a plurality of teeth.

3. In a device for manually rotating a shaft, a fixed clutch half mounted on said shaft, a handle mounting member comprising a boss and a lug projecting therefrom mounted on said shaft, means to prevent a sliding movement of said handle mounting member on said shaft, a movable clutch half slidably mounted on said boss, means to prevent the rotation of said sliding clutch half with reference to said boss, a handle pivoted to said lug, and means operatively connecting said handle to said sliding clutch half to move said clutch half along said boss.

4. In a device for manually rotating a shaft, a fixed clutch half mounted on said shaft, a handle mounting member comprising a boss and a lug projecting therefrom mounted on said shaft, means to prevent a sliding movement of said handle mounting member on said shaft, a movable clutch half slidably mounted on said boss, means to prevent the rotation of said sliding clutch half with reference to said boss, a handle pivoted to said lug, means operatively connecting said handle to said sliding clutch half to move said clutch half along said boss, and means urging said handle into a position where said sliding clutch half is disengaged.

5. In a device for manually rotating a shaft, a fixed clutch half mounted on said shaft, a handle mounting member comprising a boss and a lug projecting therefrom rotatably mounted on said shaft, means for preventing a sliding movement of said boss along said shaft, a sliding clutch member mounted on said boss, said sliding clutch member being cut out to accommodate said lug whereby the relative rotation of said boss and said clutch member is prevented, a handle pivoted to said boss, a pin in said handle, said sliding clutch member being grooved for engagement with said pin, and spring means interconnecting said handle mounting member and said handle whereby said handle is urged outwardly effecting the disengagement of said clutch halves.

6. In a device for manually rotating a shaft, a fixed clutch half mounted on said shaft, a handle mounting member comprising a boss and a lug projecting therefrom rotatably mounted on said shaft, means for preventing a sliding movement of said boss along said shaft, a sliding clutch member mounted on said boss, said sliding clutch member being cut out to accommodate said lug whereby the relative rotation of said boss and said clutch member is prevented, a handle pivoted to said boss, a pin in said handle, said sliding clutch member being grooved for engagement with said pin, and spring means interconnecting said handle mounting member and said handle whereby said handle is urged outwardly effecting the disengagement of said clutch halves, said boss having a portion bearing against said fixed clutch half whereby said disengagement is rendered positive.

7. In a device for manually rotating a shaft, a fixed clutch half mounted on said shaft, a handle mounting member rotatably mounted on said shaft, and comprising a boss having a shoulder bearing against said clutch half, and a lug for pivotally mounting a handle, a movable clutch half slidably mounted on said boss, said clutch half being cut out and forming portions abutting said lug and preventing the relative rotation of said clutch half and said handle mounting member, means on said shaft beyond said handle mounting member to prevent the sliding thereof along said shaft, and to keep the end of said boss in substantial contact with said first mentioned clutch member, a crank comprising a handle and shank and a cup-shaped portion, said cup-shaped portion having lugs adapted to form a hinged connection with the lug of said boss, a pivot pin effecting said hinged connection, said second clutch half bearing a circumferential groove, said cup-shaped portion of said crank adapted to enclose at least partially said movable clutch half, a pin in said cup-shaped portion adapted to be engaged in said groove whereby a non-rotative movement of said handle effects a sliding movement of said movable clutch half along said boss, and spring means within said cup-shaped portion interconnecting between said portion and said handle mounting member, whereby the said clutch halves are positively disengaged.

ROBERT T. HAZELTON.